May 7, 1963 DE WAYNE J. DRESSEN 3,088,752
THREE POINT HITCH
Filed Feb. 3, 1961
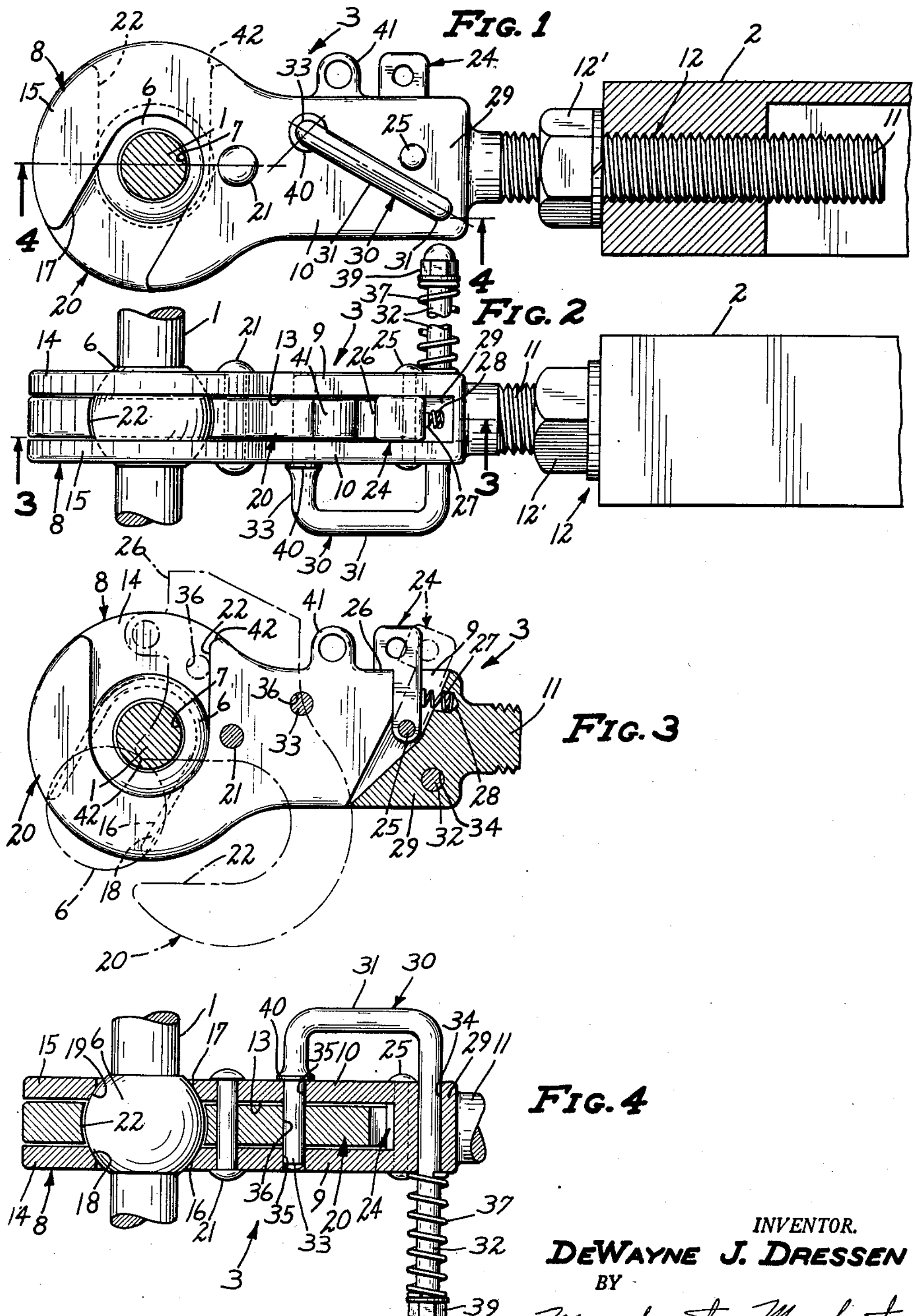
INVENTOR.
DeWAYNE J. DRESSEN
BY
Merchant & Merchant
ATTORNEYS United States Patent Office 3,088,752 Patented May 7, 1963

3,088,752
THREE POINT HITCH

De Wayne J. Dressen, Rte. 1, Red Wing, Minn.
Filed Feb. 3, 1961, Ser. No. 86,938
2 Claims. (Cl. 280—508)

This invention relates generally to couplings, and more particularly it relates to an improved hitch for attaching three point mounted implements to a tractor.

An important object of this invention is the provision of an improved three point tractor hitch for automatically attaching a trailing vehicle, such as a farm implement, to a towing vehicle, such as a tractor.

This invention is particularly adapted for use in coupling relationship with the three point hitch of a tractor, the invention including a spherical bushing slidably received on the hitching support of the implement. The novel hitch disclosed by this invention further comprises claw and knuckle apparatus particularly designed and adapted to securely embrace a spherical bushing as described above. Although the foregoing illustrates a particular use of my invention, the same is not intended to restrict the solutions which the present invention affords to the application of my novel hitch to other types of vehicle coupling situations inasmuch as many other types of vehicles, such as trailers, may be coupled with this invention with a high degree of satisfaction.

Another object of this invention is the provision of a three point hitch of improved construction which is automatically coupled on impact, but which may be uncoupled only by first unlocking one of the coupling members.

A further object of this invention is the provision of an improved three point hitch which is so designed and constructed so as to prevent accidental uncoupling of the hitch, particularly during movement of the towing and trailing vehicles over an uneven surface.

Another object of this invention is the provision of an improved three point hitch which also affords means for readily and quickly releasing or uncoupling the hitch while the stress of the carried load is applied thereon.

A still further object of this invention is the provision in a three point hitch of an improved automatic coupler of the knuckle-claw type which is particularly adapted to automatically engage a coupling element of the ball type and which is also provided with means for positively and safely locking the coupling elements in a coupled relation, said locking means also being automatically reset when the hitch is in its open position so as to provide the above described automatic coupling action.

Other objects of this invention reside in the provision of an improved three point hitch which is relatively simple in construction, economical to manufacture, strong and durable so as to permit long periods of continued use, and highly efficient in providing satisfactory performance of its objects and purposes.

The foregoing and other objects and advantages of this invention will become apparent from the following detailed specification, appended claims and attached drawings.

Referring to the drawings wherein like reference characters indicate like parts or elements throughout the several views:

FIG. 1 is a view in side elevation of my invention, some parts being broken away and some parts being shown in section;

FIG. 2 is a view in top plan thereof, some parts being broken away;

FIG. 3 is a view in section taken on the irregular line 3—3 of FIG. 2; and

FIG. 4 is a view in section taken on the irregular line 4—4 of FIG. 1.

Referring with greater particularity to the drawings, the reference numeral 1 represents generally the generally horizontal bar of the hitching support of an implement, not shown, and the reference numeral 2 represents the upper link of a three point hitch linkage of a towing vehicle, not shown. The improved three point hitch, which comprises the present invention, is represented in its entirety by the reference numeral 3. The hitch 3 comprises a generally spherical bushing 6 which has a diametrical bore 7, the bushing 6 being snugly but slidably received on the bar 1, as seen particularly in FIG. 1.

My improved three point hitch further comprises a bifurcated claw member, represented generally by the reference numeral 8. The bifurcated claw member 8 is enlarged at one end portion thereof and thereat comprises a pair of spaced generally parallel generally flat claw furcations, each represented generally by the reference numerals 9, 10 respectively. The bifurcated claw member 8 defines at the other end portion thereof a shank 11 which is adapted to be rigidly secured, as at 12, to the upper link 2 of a three point hitch linkage of a towing vehicle, not shown, and locked by a lock washer and nut assembly 12'. Although other positions of the bifurcated claw member 8 are possible, and in some instances may be certainly desirable, the securement of the shank 11 of the bifurcated claw member 8 as shown in FIG. 1 is such as to dispose the claw furcations 9, 10 of the bifurcated claw member 8 in generally vertically extending relationship and in general normality to the axis of the draw bar 1.

The claw furcations 9, 10 define therebetween a recess 13 of generally uniform transverse dimension, and said claw furcations 9, 10 also define generally annular head portions 14, 15 respectively. It is a particular feature of my invention that the annular head portions 14, 15 of the claw furcations 9, 10 each define aligned generally laterally outwardly opening coupling slots 16, 17 respectively. Also, it is a particular feature of my invention that the generally U-shaped coupling slot edges 18, 19 respectively, of the annular head portions 14, 15 are angularly formed with respect to the planes of the respective claw furcations 9, 10 whereby the coupling slot edge 18 of the claw furcation 9 forms an inwardly opening angle of considerably less than 180° with the coupling slot edge 19 of the claw furcation 10. The particular importance of this angular formation of the coupling slot edges 18, 19 will be pointed out with particularity hereinafter.

The present invention further comprises a knuckle member, represented generally by the reference numeral 20, which is pivotally mounted by means of a pivot pin 21 to the bifurcated claw member 8 in the recess 13 thereof defined between the claw furcations 9, 10. The knuckle member 20 is generally flat and is formed to be of configuration generally similar to that of the claw furcations 9, 10. The knuckle member 20 is pivotally mounted by means of a pivot pin 21 for oscillatory movements about an axis which is generally normal to the planes of the claw furcations 9, 10. Adjacent the slots 16, 17 of the claw furcations 9, 10, the knuckle member 20 defines a coupling slot 22 which opens in a generally laterally outward direction generally opposite of the opening direction of the above described coupling slots 16, 17 of the claw member 8. It is noted that the coupling slot 22 of the knuckle member 20 is formed to be of a somewhat wider horizontal dimension than the coupling slots 16, 17 of the bifurcated claw member 8, and it is also noted that the edge of the coupling slot 22 is formed at an angle generally normal to the plane of the knuckle member 20. The purpose of the immediately above described distinctions of the coupling slot 22 over the coupling slots 16, 17 will be set forth hereinafter. The knuckle member 20 is pivotally mounted so that the same is movable with respect to the bifurcated claw member 8 between an open position, as shown particularly by broken lines in FIG. 3, wherein said hitch 3 is adapted to receive the spherical bushing 6, and a closed coupling position, as shown particularly by full lines in FIGS. 1–4, wherein the bifurcated claw member 8 and the knuckle member 20 securely embrace the spherical bushing 6. It is noted that the edge of the coupling slot 22 of the knuckle member 20 is so positioned and formed so as to embrace the generally intermediate or vertically diametric portion of the spherical bushing 6 on one side thereof when the hitch 3 is in the above described closed coupling position, while the angularly disposed slot edges 18, 19 of the claw furcations 9, 10 are particularly disposed and adapted to embrace the spherical bushing 6 respectively adjacent the top and bottom thereof and on the side thereof generally opposite that embraced by the edge of the coupling slot 22 of the knuckle member 20. It is for this reason that the coupling slot edge 18 of the upper claw furcation 9 is angularly formed in the direction shown in FIG. 4, the same preventing escape of the spherical bushing 6 with respect to the remainder of the hitch 3. Also, and for the same reason, the coupling slot edge 19 of the lower claw furcation 10 is angularly formed as shown in FIG. 4 so as to prevent escape of the spherical bushing 6 with respect to the lower claw furcation 10 of the hitch 3 when the same is in the above-described closed coupling position thereof. It should be obvious that the immediately above described novel form of the claw member 8 and the knuckle member 20 of the hitch 3 provides a positive and highly desirable retaining action with respect to the spherical bushing 6.

Since it is highly desirable that means be provided for positively preventing release of the hitch 3 when the same is in its closed coupling position, the hitch 3 further comprises a resiliently biased spring-loaded locking pawl, represented generally by the reference numeral 24, which is pivotally mounted rearwardly of the knuckle member 20 and the recess 13 defined by the bifurcated claw member 8. The locking pawl 24 is pivotally mounted by means of a pivot pin 25, and is particularly adapted to engage an abutment end surface 26 defined by the knuckle member 20 for removably locking the hitch 3 in the above described closed coupling position thereof. The locking pawl 24 is biased toward the above described engaged position thereof with respect to the knuckle member 20 by means of a coil spring 27 which is secured within a recess 28 defined by the heel 29 of the bifurcated claw member 8.

Although the locking pawl 24 described above provides positive locking means for maintaining the hitch 3 in its closed coupling position, a secondary safety lock, represented generally by the reference numeral 30, may also be employed in association with the claw member 8 and the knuckle member 20 of my invention. The safety lock 30 comprises a U-rod 31 having spaced generally parallel side portions one of which is longer than the other thereof, said longer side portion being represented by the reference numeral 32 and the shorter side portion being represented by the reference numeral 33. The bifurcated claw member 8 defines generally at the heel 29 thereof a bearing aperture 34. The claw furcations 9, 10 of the claw member 8 define a pair of aligned generally coaxial lock apertures 35, the axes of which are spaced in general parallelism to the axis of the bearing aperture 34. Also, the knuckle member 20 defines a lock aperture 36 which is so disposed as to be generally co-axially aligned with the lock apertures 35 when the knuckle member 20 is in the above described closed coupling position thereof. The U-rod 31 is so disposed with respect to the claw member 8 and the knuckle member 20 that the longer side portion 32 of said U-rod 31 is slidably received within the bearing aperture 34 and the shorter side portion 33 of said U-rod 31 is rendered movable between an unlocked position in spaced relation to said knuckle member 20 and a locked position wherein the same may be received within the lock apertures 35, 36 when the hitch 3 is in the above described closed coupling position thereof. A coil spring 37 is received on the free end of the longer side portion 32 of the U-rod 31, as seen particularly in FIGS. 2 and 4, and is maintained in engagement with the claw member 8 against axial displacement by means of a washer and nut assembly 39. The coil spring 37 is provided for the purpose of biasing the safety lock 30 in the above described lock position thereof wherein the shorter side portion 33 of the U-rod 31 is received in the lock apertures 35, 36. In order to prevent axial reception of the shorter side portion 33 of the U-rod 31 beyond the necessary position thereof, a stop or abutment 40 is defined by the shorter side 33 of the U-rod 31, the same stopping against the claw member 8 and thereby providing a counterforce to the coil spring 37. Referring particularly to FIGS. 1–3, it is noted that the knuckle member 20 has a laterally disposed eye element 41, which may be provided with a line, not shown, so as to permit remote operation of the knuckle member 20. It should be noted that engagement of the spherical bushing 6 with a nose portion 42 defined by the knuckle member 20 causes automatic movement of the knuckle member 20 from said open position thereof to said closed coupling position thereof.

Having specifically described this invention, the operative simplicity thereof is thought to be easily understandable and in fact inherently explicit in said description of my invention. This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. A hitch for use in coupling relationship with the hitching support bar of a trailing implement, said hitch comprising a generally spherical bushing received on said bar, a bifurcated claw member, said bifurcated claw member comprising at one end portion thereof a pair of spaced generally parallel claw furcations the planes of which extend generally normal to the axis of said spherical bushing, said claw furcations defining therebetween a recess and each thereof also defining aligned generally laterally outwardly opening coupling slots having beveled slot edges, said bifurcated claw member defining at the other end portion thereof a shank adapted to be rigidly secured to a towing vehicle, the beveled coupling slot edges of said claw furcations being angularly formed with respect to the planes of said furcations whereby said coupling slot edge of each one of said claw furcations forms an inwardly opening angle of considerably less than 180° with the coupling slot edge of the other of said claw furcations, said hitch further comprising a knuckle member pivotally mounted to said claw member in the recess thereof defined between said furcations for oscillatory movements about an axis generally normal to the planes of said furcations, said knuckle member also defining adjacent one end portion thereof a coupling slot which opens in a generally laterally outward direction generally opposite of the opening direction of said coupling slots of said claw member, said knuckle member being movable with respect to said claw member between an open position wherein said hitch is adapted to receive said spherical bushing and a closed coupling position wherein said claw member and said knuckle member securely embrace said spherical bushing, said slotted knuckle member having a slot edge which embraces the generally intermediate portion of said spherical bushing on one side thereof when said knuckle member is in its said closed coupling position and the angularly beveled slot edges of said claw furcations embrace said spherical bushing on the side thereof generally opposite that embraced by said slot edge of said knuckle member, said hitch further comprising a spring-loaded and biased locking pawl pivotally mounted in said recess of said bifurcated claw member adjacent the other end of said knuckle member, said pawl being adapted to engage an abutment surface defined on the other end of said knuckle member for removably locking said hitch in said closed coupling position thereof, and a secondary safety lock associated with said claw member and said knuckle member, said safety lock comprising a U-rod having spaced generally parallel side portions one of which is longer than the other thereof, said claw member defining a bearing aperture and a pair of aligned generally co-axial lock apertures the axes of which are spaced in general parallelism to the axis of said bearing aperture, said knuckle member defining a lock aperture which is so disposed as to be generally co-axially aligned with the lock apertures defined by said claw member when said knuckle member is in said closed coupling position thereof, said longer side portion of said U-rod being slidably received within said bearing aperture and said U-rod being movable between an unlocked position wherein the shorter side portion thereof is in non-engaging relation to said knuckle member and a locked position wherein said shorter side portion may be received within said lock apertures when said hitch is in said closed position, and spring means associated with said long side portion of said U-rod for biasing said safety lock in said locked position thereof.

2. A hitch for use in coupling relationship with the hitching support bar of a trailing implement, said hitch comprising a generally spherical bushing received on said bar, a bifurcated claw member, said bifurcated claw member comprising at one end portion thereof a pair of spaced generally parallel claw furcations the planes of which extend generally normal to the axis of said spherical bushing, said claw furcations defining therebetween a recess and each thereof also defining aligned generally laterally outwardly opening coupling slots having beveled slot edges, said bifurcated claw member defining at the other end portion thereof a shank adapted to be rigidly secured to a towing vehicle, the beveled coupling slot edges of said claw furcations being angularly formed with respect to the planes of said furcations whereby said coupling slot edge of each one of said claw furcations forms an inwardly opening angle of considerably less than 180° with the coupling slot edge of the other of said claw furcations, said hitch further comprising a knuckle member pivotally mounted to said claw member in the recess thereof defined between said furcations for oscillatory movements about an axis generally normal to the planes of said furcations, said knuckle member also defining adjacent one end portion thereof a coupling slot which opens in a generally laterally outward direction generally opposite of the opening direction of said coupling slots of said claw member, said knuckle member being movable with respect to said claw member between an open position wherein said hitch is adapted to receive said spherical bushing and a closed coupling position wherein said claw member and said knuckle member securely embrace said spherical bushing, said slotted knuckle member having a slot edge which embraces the generally intermediate portion of said spherical bushing on one side thereof when said knuckle member is in its said closed coupling position and the angularly beveled slot edges of said claw furcations embrace said spherical bushing on the side thereof generally opposite that embraced by said slot edge of said knuckle member, said hitch further comprising a spring-loaded and biased locking pawl pivotally mounted in said recess of said bifurcated claw member adjacent the other end of said knuckle member, said pawl being adapted to engage an abutment surface defined on the other end of said knuckle member for removably locking said hitch in said closed coupling position thereof, and a secondary safety lock associated with said claw member and said knuckle member, said safety lock comprising a U-rod having spaced generally parallel side portions one of which is longer than the other thereof and also having an intermediate portion connecting the side portions thereof, said claw member defining a bearing aperture and a pair of aligned generally co-axial lock apertures the axes of which are spaced in general parallelism to the axis of said bearing aperture, said knuckle member defining a lock aperture which is so disposed as to be generally co-axially aligned with the lock apertures of said claw member when said knuckle member is in said closed coupling position thereof, said longer side portion of said U-rod being slidably received within said bearing aperture and said U-rod being movable between an unlocked position wherein the shorter side portion thereof is in non-engaging relation to said knuckle member and wherein the intermediate portion thereof is in relatively widely spaced relation to said claw member and a locked position wherein said shorter side portion may be received within said lock apertures when said hitch is in said closed position and wherein said intermediate portion of said U-rod is in relatively closely spaced relation to said claw member, spring means associated with said long side portion of said U-rod for biasing said safety lock in said locked position thereof, and an abutment defined by the short side portion of said U-rod for maintaining the intermediate portion thereof in its said relatively closely spaced relation to said claw member when said U-rod is biased in its said locked position.

References Cited in the file of this patent

UNITED STATES PATENTS

| | | |
|---|---|---|
| 1,060,441 | Engel | Apr. 29, 1913 |
| 1,491,637 | Schrum | Apr. 22, 1924 |
| 1,574,461 | Witsberger | Feb. 23, 1926 |
| 2,104,576 | Zagelmeyer | Jan. 4, 1938 |
| 2,491,373 | Goff | Dec. 13, 1949 |